United States Patent [19]

Santiago

[11] Patent Number: 4,658,095

[45] Date of Patent: Apr. 14, 1987

[54] BUILDING INTERCOM SYSTEM

[76] Inventor: Elias Santiago, P.O. Box 3199, Bayamon, P.R. 00621-3199

[21] Appl. No.: 723,432

[22] Filed: Apr. 15, 1985

[51] Int. Cl.$^4$ ................... H04M 9/04; H04M 11/00
[52] U.S. Cl. .................................. 379/103; 379/173
[58] Field of Search ............... 179/2 A, 37, 40, 5 R

[56] References Cited

U.S. PATENT DOCUMENTS

| | | | |
|---|---|---|---|
| 2,466,701 | 4/1949 | Hall | 177/353 |
| 3,284,571 | 11/1966 | Wittig | 179/2 A |
| 3,404,393 | 10/1968 | Blivice et al. | 340/276 |
| 3,484,561 | 12/1969 | Matthews | 179/39 |
| 3,728,493 | 4/1973 | TerVeen | 179/37 |
| 3,740,487 | 6/1973 | TerVeen | 179/37 |

Primary Examiner—Gene Z. Rubinson
Assistant Examiner—M. Connors
Attorney, Agent, or Firm—Oltman and Flynn

[57] ABSTRACT

An intercom system for a building having several occupied units served by the same entrance with a locked door. A control panel at the entrance has several call switches, one for each occupied unit. An individual two-wire line extends between the entrance control panel and a control panel in each occupied unit. A person in the occupied unit, which has been called from the entrance can release the entrance door after talking with the visitor. The system consumes electrical power only when needed.

19 Claims, 1 Drawing Figure

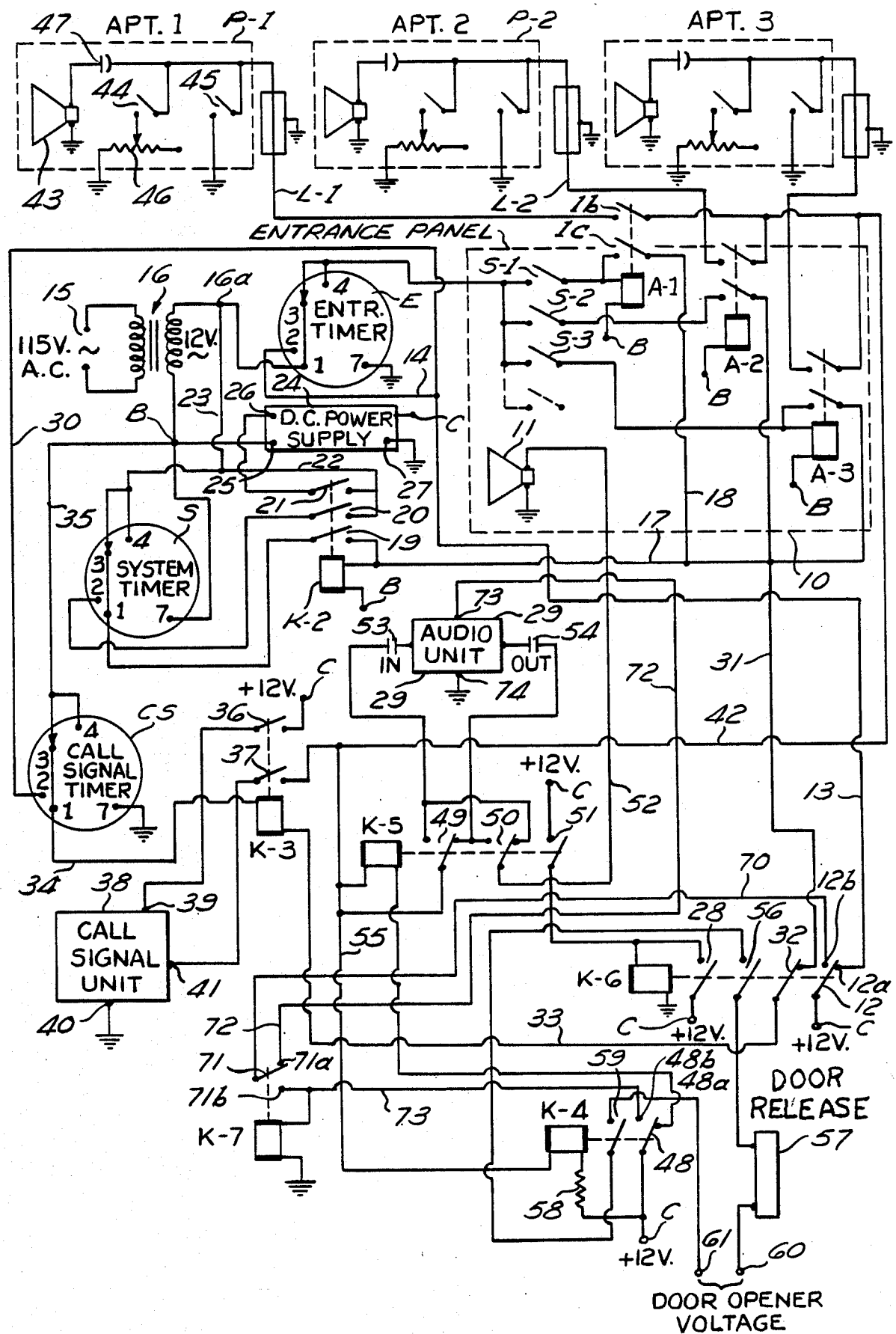

4,658,095

BUILDING INTERCOM SYSTEM

SUMMARY OF THE INVENTION

This invention relates to an intercom system for a building having a common entrance with a locked door for several apartments or business offices.

Typically, an apartment building or an office building may have a single entrance leading to several apartments or offices, such as through one or more hallways, stairways and/or elevators. Usually, there is a locked door at this entrance and a wired intercom system enabling a visitor to call any selected apartment or office from the entrance and have voice communication back and forth with the person who answers the call in the apartment or office. The intercom system also has wiring which enables the person in the apartment or office which has been called to release the door lock at the entrance to give the visitor access.

In such intercom systems, the usual practice has been to have all of the wiring between the entrance and the apartments or offices in parallel except for lines extending from call buttons at the entrance to the individual apartments or offices. Consequently, a malfunction (typically, a short circuit) of the intercom system at one apartment or office, whether by deliberate vandalism or otherwise, can disable the intercom system for all the other apartments or offices. The malfunction may cause the door release to be energized so that control over the entry of visitors is lost. Voice communication may be lost in one or both directions for all of the apartments or offices affected by the malfunction. It can be difficult and time consuming for a service technician to determine where the malfunction occurred and to gain prompt access to that apartment or office unless arrangements are made for all the affected apartments or offices to be occupied while the service technician is attempting to repair the intercom system.

The present invention is directed to a novel intercom system which substantially avoids these problems.

In accordance with the present invention, the intercom system has an individual two-wire line extending between each apartment or office and the intercom panel at the entrance. For each apartment or office, the line handles calls from the entrance, voice communication back and forth between that apartment or office and the entrance, and the release of the entrance door from that apartment or office. A malfunction in the intercom system (such as a short-circuit) at one apartment or office will not affect the system as to the other apartments or offices. Their service is not interrupted, and the location of the malfunction can be ascertained more readily without inconvenience to occupants of the other apartments or offices.

Another advantage of the present system is that it consumes electrical power only when needed, that is, when a visitor is calling, consequently extending the life of the components of the system.

Further objects and advantages of this invention will be apparent from the following detailed description of a presently preferred embodiment which is illustrated schematically in the accompanying drawing.

DESCRIPTION OF THE DRAWING

The single FIGURE of the drawing is a schematic electrical circuit diagram of the present system.

DETAILED DESCRIPTION

The present intercom system is for use in an apartment building or office building having a plurality of separate individual building units, such as apartments, and an entrance having a normally-locked inside door which controls access to the hallways, stairways and/or elevators leading to the building units. Typically, all of the apartment owners and tenants have a key for unlocking this door but any visitor must call the apartment he or she wants to visit and have someone in that apartment release the lock on the entrance door by operating a switch in the apartment.

Referring to the drawing, at the entrance, outside the normally-locked inside door, there is an entrance panel 10 having a loudspeaker/microphone unit indicated schematically by the reference numeral 11. The entrance panel also has a plurality of normally-open call switches, one for each apartment. These may be part of a keyboard of known design. Three of these switches are shown at S-1, S-2 and S-3. A visitor seeking entry to a particular apartment will close the corresponding call switch, such as switch S-1 for apartment 1. For each call switch S-1, S-2, etc. there is a corresponding call relay A-1, A-2, etc.

The system has three timers; an entrance panel call timer E, a system timer S, and a call signal timer CS, all of known design. Each of these timers has two terminals, 2 and 7, across which an input voltage is to be applied to start the time interval of the timer. Each timer also has two other terminals, 1 and 4, which are closed before and during the time interval of the timer and which open at the end of this timer interval. In one practical embodiment timer E has a time interval of a fraction of a second, timer S has a time interval within the range from 20 to 30 seconds, and timer CS has a time interval within the range from 5 to 7 seconds. Both timers S and CS can be adjusted to a different time interval than just stated. Entrance timer E prevents more than one apartment being called simultaneously.

The system also has an A.C. operated system timer relay K-2, an A.C. operated call signal relay K-3, a D.C. operated door release relay K-4, a D.C. operated talk relay K-5, a D.C. operated timer-off relay K-6 and a D.C. operated audio unit turn-off relay K-7, which are described in detail hereinafter.

When a visitor enters the building with the intention of visiting apartment 1, for example, the visitor manually closes call switch S-1 in the entrance panel 10. A 115 volt AC power supply 15 is connected across the primary of a transformer 16, the 12-volt secondary of which has its upper terminal 16a connected to terminal 1 of entrance panel cell timer E. In timer E, terminal 1 now engages terminal 4 which is connected to the fixed contact of switch S-1. The lower terminal B of the secondary of transformer 16 is connected directly to one side of the coil of call relay A-1, the other side of which is connected directly to the mobile contact of switch S-1. Therefore, when switch S-1 is closed, relay A-1 is energized from the A.C. power supply 15 through transformer 16 and the now-closed terminals 1 and 4 of timer E. Timer E does not turn on until a D.C. power supply 24 is turned on, as explained hereinafter.

When call relay A-1 is energized initially, its normally-open contacts 1c close. The closing of the A-1 relay contacts 1c completes an initial energization circuit for the call signal relay K-3 as follows: from the upper terminal 16a of the transformer secondary through contacts 1 and 4 of timer E, switch S-1, relay contacts 1c, lines 18 and 31, a set of normally-closed contacts 32 in the timer-off relay K-6, line 33, through the coil of relay K-3, line 34, contacts 1 and 4 of call signal timer C5, and line 35 to the lower terminal B of the transformer secondary.

The closing of the A-1 relay contacts 1c also completes an energization circuit for the coil of the system timer relay K-2. One side of the K-2 relay coil is connected to the transformer secondary's lower terminal B. The other side of the K-2 relay coil is connected through lines 17 and 18 and the now-closed contacts 1c of relay A-1, the now-closed entrance panel switch S-1 and the terminals 4 and 1 of entrance panel call timer E to the upper terminal 16a of the transformer secondary. This energization of the coil of relay K-2 causes its normally-open contacts 19, 20 and 21 to close.

The now-closed contacts 20 of relay K-2 connect the input terminals 2 and 7 of system timer S across the secondary of transformer 16 to start the 20–30 second time interval of system timer S during which its terminals 1 and 4 remain closed. Terminal 7 of timer S is connected to the lower terminal B of the transformer secondary. Terminal 2 of timer S is connected through the K-2 relay contacts 20 and lines 22 and 23 to the upper terminal 16a of the transformer secondary. Thus, the system timer S turns on in response to the closing of the K-2 relay contacts 20.

The now-closed contacts 19 of relay K-2 complete a holding circuit for keeping the coil of this relay energized independent of entrance panel switch S-1 and entrance panel call timer E. This holding circuit is through the now-closed terminals 1 and 4 of system timer S. Therefore, the coil of relay K-2 will stay energized throughout the 20–30 second timing interval of system timer S.

The K-2 relay contacts 19 also complete a holding circuit for the coil of call relay A-1 through lines 17 and 18 and the A-1 relay contacts 1c to keep it energized independent of entrance panel switch S-1 and entrance panel call timer E. This holding circuit is through the output terminals 1 and 4 of system timer S. Therefore, the coil of relay A-1 will remain energized throughout the 20–30 second timing interval of system timer S.

The now-closed K-2 contacts 21 complete a circuit for turning on a D.C. power supply 24, which receives its input power from the secondary of transformer 16. One power supply input terminal 25 of the D.C. power supply is connected to the lower terminal B of the transformer secondary. The other power supply input terminal 26 of the D.C. power supply 24 is connected to the upper terminal 16a of the transformer secondary through the now-closed K-2 contacts 21 and lines 22 and 23. The D.C. power supply 24 produces +12 volts across its output terminal C and a grounded output terminal 27.

This +12 volts D.C. appears on the two terminals marked "C" at the timer-off relay K-6. One of these +12 volt D.C. terminals is connected through a set of K-6 relay contacts 12 and lines 13 and 14 to input terminal 2 of entrance panel call timer E, as already described. The other input terminal 7 of timer E is grounded. Timer E begins its time interval when the D.C. power supply 24 comes on. This time interval is only a fraction of a second. At the end of this time interval, contacts 1 and 4 of timer E disengage so that now the continued energization of the coil of call relay A-1 is through the K-2 relay contacts 19 and system timer S.

The other +12 volt D.C. terminal C at relay K-6 is connected to a set of normally-open contacts 28 of this relay.

The +12 volt output of the D.C. power supply 24 also is applied to terminal C at relay K-3, to terminal C at the door release relay K-4, and to terminal C at the talk relay K-5.

The audio unit 29 is turned on by the D.C. power supply 24 when the person in the apartment which is being called first closes the talk switch 44 and the timer-off relay K-6 is energized.

The time interval of the call signal timer CS starts when the D.C. power supply 24 is turned on. Input terminal 2 of timer CS is connected by lines 30 and 13 and the normally-closed K-6 relay contacts 12 to the +12 volt DC power supply output terminal C. The other input terminal 7 of timer CS is grounded. Timer CS has a timing interval of 5–7 seconds after the D.C. power supply comes on.

When energized initially in response to the closing of the A-1 relay contacts 1c, as described, the coil of call signal relay K-3 closes two sets of normally-open contacts 36 and 37 which control a call signal unit 38. This call signal unit has a positive power supply terminal 39 which is connected through the K-3 relay contacts 36 to the +12 volt DC power supply terminal C. The call signal unit also has a grounded power supply terminal 40. Call signal unit 38 also has an output terminal 41 which is connected through the K-3 relay contacts 37 and line 42 to a set of normally-open contacts 1b in call relay A-1.

The energization of call relay A-1, as described, has closed its contacts 1b. An individual line L-1 extends from the fixed contact of 1b to a control panel P-1 in apartment 1. Line L-1 is a two-wire line having a sleeve-like outer conductor which is grounded and an inner conductor insulated from the outer conductor and connected conductively to relay contacts 1b. Line L-1 extends from the entrance panel 10 to apartment 1 only and not to any of the other apartments. Panel P-1 has a loudspeaker/microphone unit 43 of known design with a manually operable, normally-open "talk" switch 44. Panel P-1 also has a manually operable, normally-open, door switch 45. The respective mobile contacts of switches 44 and 45 are connected directly to line L-1. The fixed contact of door switch 45 is grounded. The fixed contact of talk switch 44 is connected to the adjustable contact of a variable resistor 46, one terminal of which is grounded and the opposite terminal of which is open-circuited. A capacitor 47 is connected between line L-1 and the microphone/speaker unit 43.

When turned on, as described, the call signal unit 38 produces an electrical signal on its output terminal 41 which is transmitted through the now-closed contacts 37 of relay K-3, line 42, the now-closed contacts 1b of relay A-1, and line L-1 to the control panel P-1 in apartment 1. This signal operates the microphone/loudspeaker unit 43 to produce an audible tone which tells a person in apartment 1 that a visitor is calling from the entrance panel 10.

Having been energized initailly by the closing of A-1 relay contacts 1c, the coil of relay K-3 remains energized across the transformer secondary through a holding circuit which includes terminals 4 and 1 of system timer S (which remain engaged during its 20–30 second time interval), the K-2 relay contacts 19, lines 17 and 31, the normally-closed K-6 relay contacts 32, line 33, the coil of relay K-3, line 34, the 1 and 4 terminals of call signal timer CS (which remain closed during its 5-7 seconds time interval), and line 35.

The coil of relay K-3 will be de-energized when the call signal timer CS reaches the end of its 5-7 second time interval, at which time its terminals 1 and 4 will be disconnected. When deenergized, relay K-3 will turn off the call signal unit 38.

Talk relay K-5 controls the connections of the input and output terminals of audio unit 29 to the microphone/loudspeaker unit 11 at entrance panel 10 and the microphone/loudspeaker unit 43 at the control panel P-1 of apartment 1 after this apartment has been called.

The coil of talk relay K-5 is energized in response to the closing of the talk switch 44 in apartment panel P-1. One terminal of the coil of relay K-5 is connected to line 42 leading to apartment panel P-1. The opposite terminal of the coil of relay K-5 is connected through a set of normally-closed contacts 48 and 48a of relay K-4 to a +12 volt D.C. power supply terminal C. The closing of talk switch 44 in apartment panel P-1 completes an energization circuit for the coil of relay K-5 as follows: from this +12 volt D.C. power supply terminal C through the normally-closed K-4 relay contacts 48 and 48a, the coil of relay K-5, line 42, the now-closed contacts 1b of relay A-1, line L-1, talk switch 44, and resistor 46 to ground. When the coil of relay K-5 is energized, it closes three sets of normally-open contacts 49,50 and 51 in this relay.

While relay K-5 is energized (i.e., while the talk switch 44 remains closed by the person in apartment 1), that person can talk to the visitor at the entrance over line L-1. The talk circuit extends from the microphone/speaker unit 43 and capacitor 47 in apartment panel P-1, through line L-1, the now closed contacts 1b of call relay A-1, line 42, the now-closed contacts 49 of relay, K-5, input capacitor 53, audio unit 29, output capacitor 54, the now-closed contacts 50 of relay K-5, and line 52 to the micro-phone/speaker unit 11 in entrance panel 10.

The closing of K-5 relay contacts 51 completes an energization circuit for the coil of the timer-off relay K-6 as follows: From +12 volt D.C. terminal C through the now-closed contacts 51 and through the coil of relay K-6 to ground.

When the coil of relay K-6 is energized it opens its normally-closed sets of contacts 12 and 12a, closes contacts 12 and 12b, and opens its normally-closed contacts 32. Also, it closes a normally-open set of K-6 contacts 28 to complete a holding circuit for maintaining the coil of relay K-6 energized independent of talk relay K-5. Also, it closes a set of normally-open K-6 relay contacts 56 connected to one terminal of an electrically operated, entrance door release 57 of known design.

The opening of the normally-closed K-6 relay contacts 12 and 12a turns off the entrance panel call timer E and the call signal timer CS.

The opening of the normally-closed K-6 relay contacts 32 de-energizes the coil of relay K-3.

The closing of K-6 relay contacts 12 and 12b completes an energization circuit for audio unit 29 as follows: from the +12 volt terminal C through K-6 relay contacts 12 and 12b, line 70, the normally-closed contacts 71 and 71a of relay K-7, line 72 to one power supply terminal 73 of audio unit, whose opposite power supply terminal 74 is grounded.

When the person in the apartment being called (in this case, apartment 1) keeps the talk switch 44 closed, that person can talk to the visitor at the entrance. When the person in the apartment releases the talk switch, which now opens, that person can listen to the visitor at the entrance.

With the talk switch 44 in the apartment closed, the talk circuit extends from the microphone unit 43 and capacitor 47 in apartment panel P-1, through line L-1, the now closed contacts 1b of call relay A-1, line 42, the now-closed contacts 49 of relay K-5, input capacitor 53, audio unit 29, output capacitor 54, the now-closed contacts 50 of relay K-5, and line 52 to the speaker/microphone unit 11 in entrance panel 10.

If desired, the voice communication part of the present system may have a voice-activated arrangement.

When the person in apartment 1 releases the talk switch 44 to its normally-open position, this de-energizes the coil of relay K-5. However, the coil of relay K-6 will remain energized through its now-closed holding contacts 28 until the D.C. power supply 24 is turned off.

The input and output connections of the audio unit 29 are reversed when the person in the apartment which has been called releases the talk switch 44 in the apartment control panel P-1, permitting this switch to return to its normally-open condition. When switch 44 opens, relay K-5 is de-energized. The K-5 relay contacts 50 now connect the input of audio unit 29 to the microphone/loudspeaker unit 11 at entrance panel 10, and the K-5 relay contacts 49 now connect the output of audio unit to the microphone/loudspeaker unit 43 in the apartment which has been called. Therefore while call switch 44 is released and call relay K-5 is de-energized, the visitor at the entrance can speak to the person in the apartment which has been called.

The door release relay K-4 has one terminal of its coil connected to line 55 leading to the door switch 45 in apartment 1 via line 42, the now-closed contacts 1b of relay A-1, and line L-1. The opposite terminal of the K-4 relay coil is connected through a resistor 58 to a +12 volt D.C. terminal C. (Resistor 58 is needed if the coils of K-4 and K-5 have equal resistance.) The coil of relay K-4 is energized in response to the closing of door switch 45. This closes a set of normally-open contacts 59 in relay K-4 to complete an energization circuit for the door opener 57 from a voltage source connected across terminals 60 and 61 as follows: from voltage source terminal 60 through the door opener 57, the now-closed K-6 relay contacts 56, and the now-closed K-4 relay contacts 59 to the other terminal 61 of the door opener voltage source. The door opener voltage source across terminals 60 and 61 may be A.C. or D.C. Typically, the door opener 57 is a device that releases the lock on the entrance door, enabling the visitor to open the door.

The energization of the coil of relay K-4 also causes the coil of relay K-7 to be energized as follows: from the +12 volt terminal C at relay K-4, through its now-closed contacts 48 and 48b, and line 73, to one terminal of the K-7 relay coil, the opposite terminal of which is grounded. Relay K-7 has a fixed contact 71b which is also connected to line 73 and is engaged by the mobile relay contact 71 when the K-7 relay coil is energized.

This completes a holding circuit to keep K-7 energized independent of relay K-4. The purpose of keeping K-7 energized is to turn off the audio unit 29 after the door release 57 has been activated. The audio unit is turned off because of the opening of the K-7 relay contacts 71 and 71a when the coil of relay K-7 is energized. K-7 will remain energized for the remainder of the 20–30 second time interval of system timer S.

SUMMARY OF THE OPERATION

A visitor to the apartment building closes call switch S-1, for example, in entrance panel 10, thereby energizing the coil of the corresponding relay A-1.

Relay A-1 turns on relays K-2 and K-3. Relay A-1 remains on independent of switch S-1 through a holding circuit which includes K-2 relay contacts 19.

When turned on, relay K-2 turns on system timer S (with a 20–30 second time interval) and D.C. power supply 24. After coming on, relay K-2 provides a holding circuit for itself and for relay A-1 which keeps both of them on independent of entrance panel switch S-1. Relay K-2 remains on until the finish of the time interval of system timer S.

When turned on, the D.C. power supply 24 starts the entrance panel call timer E (with a fraction of a second time interval) and starts the call signal timer CS (with a 5–7 second time interval). Also, the D.C. power supply 24 now energizes +12 volt D.C. power terminals C at relays K-4, K-5 and K-6.

When relay K-3 is turned on in response to relay A-1, it turns on call signal unit 38, which sends a calling signal to apartment 1. The K-2 relay contacts 19 provide a holding circuit which keeps relay K-3 energized after the visitor release call switch S-1 at the entrance panel. At the end of the 5–7 second time interval of call signal timer CS, its contacts 4 and 1 open. This will de-energize the coil of relay K-3, and the K-3 relay contacts 36 and 37 open, turning off its power supply and disconnecting the output terminal 41 of call signal unit 38 from the line 42 leading to the A-1 relay contacts 1b and line L-1 going to apartment 1. Relay K-3 will be turned off if a person in the called apartment closes the talk switch 44 during the time interval of timer CS.

The person in apartment 1 who answers this call must first close the talk switch 44 to speak to the visitor before he can operate the door opener 57.

When the talk switch 44 in apartment 1 is first closed, it turns on relay K-5, which now turns on the relay K-6, which turns on audio unit 29. Also, talk switch 44 turns off the call signal coming from the call signal unit 38 at the entrance panel if that signal has not already ended. While the talk switch 44 in apartment 1 remains closed, the audio unit 29 enables the person in the apartment to talk to the visitor at the entrance. When switch 44 is released and opens, the person in the apartment can listen to the visitor at the entrance. This happens as follows: with switch 44 closed, K-5 is on and it connects the apartment speaker/microphone 43 to the input of audio unit 29 and connects the output of the audio unit to the entrance panel speaker/microphone 11. Conversely, when switch 44 is released and opens, it turns off relay K-5, which now connects the entrance panel speaker/microphone 11 to the input of audio unit 29 and connects the output of the aduio unit to the apartment speaker/microphone 43.

When relay K-6 is turned on, it turns off the D.C. power supply to the entrance timer E (which has already completed its fraction of a second timing interval). K-6 also turns off the D.C. power to the call signal timer CS and relay K-3. When turned on, relay K-6 provides an energization circuit for the door opener 57 so that the entrance door can now be opened whenever the person in apartment 1 closes the door switch 45 there. Relay K-6 remains on until the D.C. power supply 24 goes off.

If the person in apartment 1 closes the door switch 45 before closing the talk switch 44 to determine the identity of the visitor, the door opener 57 will not operate because relays K-5 and K-6 will not have come on.

If the door switch 45 in apartment 1 has not been closed by the end of the 20–30 second time interval of system timer S, the opening of that timer's contacts 4 and 1 will break the energization circuit for the coil of relay K-2 through its holding contacts 19 and will break the energization circuit for the coil of relay A-1 through its holding contacts 1c. Therefore, relays K-2 and A-1 will be de-energized and the visitor must now close the entrance panel swtich S-1 again to initiate the next operating cycle of the intercom system.

If a person in the apartment, after learning the identity of the visitor, closes the door switch 45 during the interval of system timer S, this will energize relay K-4, which now energizes the door opener 57 through the now-closed K-4 contacts 59. Also, when relay K-4 comes on its normally-closed contacts 48 and 48a open and turn off relay K-5, and its contacts 48 and 48b close and turn on relay K-7.

When relay K-7 is energized in response to K-4, as described, its normally-closed contacts 71 and 71a open and turn off the audio unit 29, and its contacts 71 and 71b close and complete a holding circuit for K-7 through the now-closed K-6 contacts 12 and 12b. This holding circuit keeps K-7 energized independent of K-4 as long as K-6 stays on.

OTHER APARTMENTS

Apartment 2 has a control panel P-2 which is identical to the control panel P-1 in apartment 1. Similarly, apartment 3 has an identical control panel P-3 as do all of the other apartments in the system (which are not shown).

At the entrance panel 10, a call switch S-2 and a call relay A-2 provide access to a second two-wire line L-2, which extends from the entrance panel only to the control panel P-2 in apartment 2 and not to any of the other apartment panels. Similarly, a separate call switch S-3 and a call relay A-3 provide access to a third two-wire line A-3 which extends from the entrance panel only to the control panel P-3 in apartment 3 and not to any of the other apartments.

The sub-circuit which includes call switch S-2 and call relay A-2 is in parallel with the already described sub-circuit having call switch S-1 and relay A-1. This is also true of the sub-circuit which includes call switch S-3 and call relay A-3. Therefore, the closing of switch S-2 by a visitor will initiate a call to apartment 2, and the closing of switch S-3 will initiate a call to apartment 3. Thereafter, the operation of the system will be the same as already decribed in detail for apartment 1.

It will be understood that the complete system may serve any desired number of apartments or offices in the building, and not just three as shown in the simplified arrangement depicted in the drawing. Each apartment or office will have its own control panel identical to P-1, and at the entrance panel there will be a call switch and a call relay leading to the individual line going from the entrance panel only to the corresponding apartment or office and not to any of the others.

It will be evident that the present intercom system consumes power only when the D.C. power supply 24 is on, which is only during the 20-30 second time interval of system timer S after an apartment or office is called by a visitor at the entrance.

I claim:

1. An intercom system for a building having a locked entrance door leading to a plurality of occupied units in the building, and an electrically operable release for said entrance door, said system having:

an entrance control panel at said entrance with call switches for initiating call signals from said entrance to the building units individually and a microphone/loudspeaker unit for voice communication with the building units;

and plurality of building unit control panels located individually in said building units and each having a microphone/loudspeaker unit for voice communication with the microphone/loudspeaker unit at the entrance panel, a talk switch selectively operable to enable a person in the building unit to speak to the visitor and a door switch selectively operable to activate said release for the entrance door;

the improvement which comprises:

a plurality of separate lines each extending individually from said entrance control panel to only one corresponding building unit control panel and each terminating at said corresponding building unit control panel for conducting:

(a) a call signal from said entrance control panel to any selected building unit control panel; and (b) voice communication back and forth between the microphone/loudspeaker unit in each building unit control panel and the microphone/loudspeaker unit in said entrance control panel; and (c) a signal from each building unit control panel to said entrance control panel for releasing the entrance door.

2. A system according to claim 1, wherein each of said lines is a two-conductor line with an inner conductor and a grounded outer conductor.

3. A system according to claim 1 and further comprising:

a plurality of call relays at said entrance control panel, each having sets of contacts operatively connected individually to the separate line which extends from said entrance control panel to the control panel of the corresponding building unit.

4. A system according to claim 3 and further comprising:

power supply means at said entrance control panel;

and a plurality of relays and electrically operated timers at said entrance control panel operatively connected to said call switches and said lines to control the signal transmission over said lines, said control relays and timers being operatively connected to said power supply means to draw power therefrom only after the operation of one of said call switches.

5. A system according to claim 4 wherein:

said power supply means includes a D.C. power supply;

and further comprising:

relay-operated means operatively connected to said D.C. power supply to be energized by said D.C. power supply and controlling voice communication back and forth between the microphone/loudspeaker unit in said entrance control panel and the microphone/loudspeaker unit in the building unit which has been called;

relay-operated means operatively connected to said D.C. power supply to be energized by said D.C. power supply and controlling the release of the entrance door;

and means keeping said D.C. power supply off until after the operation of one of said call switches.

6. A system according to claim 5 wherein:

said relay-operated means controlling voice communication comprises an audio unit energized by said D.C. power supply and having an input and an output;

and one of said relays is a talk relay operative:

(a) when energized, to connect the input of said audio unit to the microphone/loudspeaker unit at the control panel of the building unit which has been called and to connect the output of said audio unit to the microphone/loudspeaker unit at the entrance control panel; and (b) when de-energized, to connect the input of said audio unit to the microphone/loudspeaker unit at the entrance control panel and to connect the output of said audio unit to the microphone/loudspeaker unit at the control panel in the the building unit which has been called.

7. A system according to claim 6, and further comprising:

a talk switch at the control panel in the building unit which has been called, said talk switch being operatively connected to control the energization of said talk relay after said D.C. power supply has been turned on.

8. An intercom system for a building having a locked entrance door leading to a plurality of occupied units in the building, and an electrically operable release for said entrance door, said system having:

an entrance control panel at said entrance with call switches for initiating call signals from said entrance to the building units individually and a microphone/loudspeaker unit for voice communication with the building units;

and plurality of building unit control panels located individually in said building units and each having a microphone/loudspeaker unit for voice communication with the microphone/loudspeaker unit at the entrance panel, a talk switch selectively operable to enable a person in the building unit to speak to the visitor and a door switch selectively operable to activate said release for the entrance door;

the improvement which comprises:

a plurality of separate lines extending individually from said building unit control panels to said entrance control panel for conducting:

(a) a call signal from said entrance control panel to any selected building unit control panel; and (b) voice communication back and forth between the microphone/loudspeaker unit in each building unit control panel and the microphone/loudspeaker unit in said entrance control panel; and (c) a signal from each building unit control panel to said entrance control panel for releasing the entrance door;

a plurality of call relays at said entrance control panel, each operatively connected individually between one of said call switches and the line which extends between the control panel of said building unit and said entrance control panel;

power supply means at said entrance control panel;

and a plurality of control relays and electrically operated timers at said entrance control panel operatively connected to said call switches and said lines to control the signal transmission over said lines, said control relays and timers being operatively connected to said power supply means to draw power therefrom only after the operation of one of said call switches;

said power supply means including a transformer having a primary for connection to an A.C. source and a secondary;

said timers including an entrance panel call timer operatively connected between the transformer secondary and each of said call switches to provide an initial energization circuit for the corresponding call relay when the corresponding call switch is closed, said entrance panel call timer having a predetermined time interval and being operative to disconnect said initial energization circuit for the corresponding call relay at the end of said time interval;

said control relays including a system timer relay operatively connected to the transformer secondary to be energized in response to the energization of any of said call relays;

and said system timer relay and each of said call relays having respective holding contacts which provide a holding circuit for keeping the call relay energized independent of the corresponding call switch for a time interval after the system timer relay is energized.

9. A system according to claim 8 wherein said timers include:
a system timer operable to start said time interval following the energization of said system timer relay and to open said holding circuit for the call relay at the end of said time interval.

10. An intercom system for a building having a locked entrance door leading to a plurality of occupied units in the building, and an electrically operable release for said entrance door, said system having:
an entrance control panel at said entrance with call switches for initiating call signals from said entrance to the building units individually and a microphone/loudspeaker unit for voice communication with the building units;
and plurality of building unit control panels located individually in said building units and each having a microphone/loudspeaker unit for voice communication with the microphone/loudspeaker unit at the entrance panel, a talk switch selectively operable to enable a person in the building unit to speak to the visitor and a door switch selectively operable to activate said release for the entrance door;
the improvement which comprises:
a plurality of separate lines extending individually from said building unit control panels to said entrance control panel for conducting:
(a) a call signal from said entrance control panel to any selected building unit control panel; and
(b) voice communication back and forth between the microphone/loudspeaker unit in each building unit control panel and the microphone/loudspeaker unit in said entrance control panel; and
(c) a signal from each building unit control panel to said entrance control panel for releasing the entrance door;

a plurality of call relays at said entrance control panel, each operatively connected individually between one of said call switches and the line which extends between the control panel of said building unit and said entrance control panel;

power supply means at said entrance control panel;

and a plurality of control relays and electrically operated timers at said entrance control panel operatively connected to said call switches and said lines to control the signal transmission over said lines, said control relays and timers being operatively connected to said power supply means to draw power therefrom only after the operation of one of said call switches;

said power supply means comprising:
a step-down transformer having a primary for connection to an A.C. source and a secondary operatively connected to at least one of said timers for operating the latter and operatively connected to certain of said relays for energizing them;
a D.C. power supply operatively connected to the secondary of said transformer to be energized therefrom;
means operatively connecting another of said timers to the output of said D.C. power supply for operation by the latter;
and means operatively connecting the remaining relays to the output of said D.C. power supply to be energized therefrom.

11. A system according to claim 10 wherein:
said timers include an entrance panel call timer operatively connected between the transformer secondary and each of said call switches to provide an initial energization circuit for the corresponding call relay when the corresponding call switch is closed, said entrance call panel timer having a predetermined time interval and being operative to disconnect said initial energization circuit for the corresponding call relay at the end of said time interval;
said control relays include a system timer relay operatively connected to the transformer secondary to be energized in response to the energization of any of said call relays;
and said system timer relay and each of said call relays have respective holding contacts which provide a holding circuit for keeping the call relay energized independent of the corresponding call switch for a time interval after the system timer relay is energized.

12. A system according to claim 11 wherein said timers include:
a system timer operable to start said time interval following the energization of said system timer relay and to open said holding circuit for the call relay at the end of said time interval.

13. A system according to claim 12 and further comprising:
a call signal unit operable, when energized, to produce a call signal;
and wherein:
said control relays include a call signal relay operatively connected to the transformer secondary and each of said call relays to be energized in response to the energization of any of said call relays, said call signal relay being operative to connect said call signal unit to said D.C. power supply for energization thereby and to connect said call signal unit through the energized call relay to the line extending to the corresponding building unit control panel.

14. A system according to claim 4 and further comprising:
a call signal unit operable, when energized, to produce a call signal;
and wherein:
said control relays include a call signal relay operatively connected to said power supply means and each of said call relays to be energized in response to the energization of any of said call relays, said call signal relay being operative to connect said call signal unit to said power supply for energization thereby and to connect said call signal unit through the energized call relay to the line extending to the corresponding building unit control panel.

15. A system according to claim 4 wherein:
said control relays include a talk relay operably connected to said call relays to control voice communication between said entrance panel and the building unit which has been called from the entrance panel.

16. A system according to claim 15 and further comprising:
an audio unit operatively connected to said talk relay to enable a person in the building unit which has been called
(a) to speak over the corresponding line to the visitor at the entrance when the talk switch in that building unit is closed, and
(b) to listen to the visitor at the entrance over the corresponding line when the talk switch in that building unit is open.

17. A system according to claim 1 and further comprising:
means preventing the release of the entrance door until after a talk switch has been operated in the building unit which has been called from the entrance panel.

18. An intercom system for a building having a locked entrance door leading to a plurality of occupied units in the building, and an electrically operable release for said entrance door, said system having:
an entrance control panel at said entrance with call switches for initiating call signals from said entrance to the building units individually and a microphone/loudspeaker unit for voice communication with the building units;
and plurality of building unit control panels located individually in said building units and each having a microphone/loudspeaker unit for voice communication with the microphone/loudspeaker unit at the entrance panel, a talk switch selectively operable to enable a person in the building unit to speak to the visitor and a door switch selectively operable to activate said release for the entrance door;
the improvement which comprises:
a plurality of separate lines extending individually from said building unit control panels to said entrance control panel for conducting:
(a) a call signal from said entrance control panel to any selected building unit control panel; and
(b) voice communication back and forth between the microphone/loudspeaker unit in each building unit control panel and the microphone/loudspeaker unit in said entrance control panel; and
(c) a signal from each building unit control panel to said entrance control panel for releasing the entrance door;
a plurality of call relays at said entrance control panel, each operatively connected individually between one of said call switches and the line which extends between the control panel of said building unit and said entrance control panel;
power supply means at said entrance control panel;
and a plurality of control relays and electrically operated timers at said entrance control panel operatively connected to said call switches and said lines to control the signal transmission over said lines, said control relays and timers being operatively connected to said power supply means to draw power therefrom only after the operation of one of said call switches;
said control relays including:
a talk relay operably connected to said call relays to control voice communication between said entrance panel and the building unit which has been called from the entrance panel;
and a door release relay for releasing the entrance door;
and further comprising:
means preventing said door release relay from releasing the entrance door until after a talk switch has been operated in the building unit which has been called from the entrance panel.

19. A system according to claim 18 wherein each building unit control panel has a door switch operatively connected over the corresponding line to said door release relay for actuating the latter to release the entrance door following an operation of the talk switch in the same building unit control panel.

* * * * *